(12) United States Patent
Ortlieb

(10) Patent No.: US 11,608,134 B2
(45) Date of Patent: Mar. 21, 2023

(54) ADAPTER FOR ATTACHING BAGS OR CONTAINERS OF LUGGAGE CARRIERS

(71) Applicant: ORTLIEB SPORTARTIKEL GMBH, Heilsbronn (DE)

(72) Inventor: Hartmut Ortlieb, Heilsbronn (DE)

(73) Assignee: ORTLIEB SPORTARTIKEL GMBH, Heilsbronn (DE)

( * ) Notice: Subject to any disclaimer, the term of this patent is extended or adjusted under 35 U.S.C. 154(b) by 0 days.

(21) Appl. No.: 17/764,526

(22) PCT Filed: Sep. 26, 2020

(86) PCT No.: PCT/DE2020/000221
§ 371 (c)(1),
(2) Date: Apr. 3, 2022

(87) PCT Pub. No.: WO2021/063432
PCT Pub. Date: Apr. 8, 2021

(65) Prior Publication Data
US 2022/0348281 A1    Nov. 3, 2022

(30) Foreign Application Priority Data

Oct. 1, 2019    (DE) .............. 20 2019 004 035.8
Oct. 29, 2019   (DE) .............. 20 2019 004 429.9

(51) Int. Cl.
*B62J 7/08*    (2006.01)
*B62J 9/27*    (2020.01)

(52) U.S. Cl.
CPC .. *B62J 7/08* (2013.01); *B62J 9/27* (2020.02)

(58) Field of Classification Search
CPC ......... B62J 9/23; B62J 9/24; B62J 9/26; B62J 9/27; B62J 7/08; B62J 7/04
See application file for complete search history.

(56) References Cited

U.S. PATENT DOCUMENTS

| | | | |
|---|---|---|---|
| 8,028,877 B2 * | 10/2011 | Lien .......................... | B62J 9/27 224/419 |
| 8,292,139 B2 * | 10/2012 | Golub ....................... | B62J 7/08 224/558 |

(Continued)

FOREIGN PATENT DOCUMENTS

| | | |
|---|---|---|
| DE | 29612256 U1 | 10/1996 |
| DE | 10031069 A1 | 3/2001 |

(Continued)

OTHER PUBLICATIONS

PCT/DE2020/000221, International Search Report and Written Opinion dated Jan. 22, 2021, 14 pages—German, 3 pages—English.

*Primary Examiner* — Corey N Skurdal
(74) *Attorney, Agent, or Firm* — Andrew F. Young; Nolte Lackenbach Siegel

(57) ABSTRACT

An adapter system for mounting or fastening bags or containers with fixing elements for engaging between struts of a luggage carrier and which can be reversibly attached on the upper side of a luggage carrier. The adapter system has at least two holding elements which engage on opposite struts of the adapter and are equipped with a spring-loaded and rotatably mounted lever, and the rotatably mounted lever has a geometry at that end of the lever which faces away from the pivot point and securely clamps the adapter system on the luggage carrier struts in a self-locking manner.

7 Claims, 4 Drawing Sheets

(56) References Cited

U.S. PATENT DOCUMENTS

Figure 6:
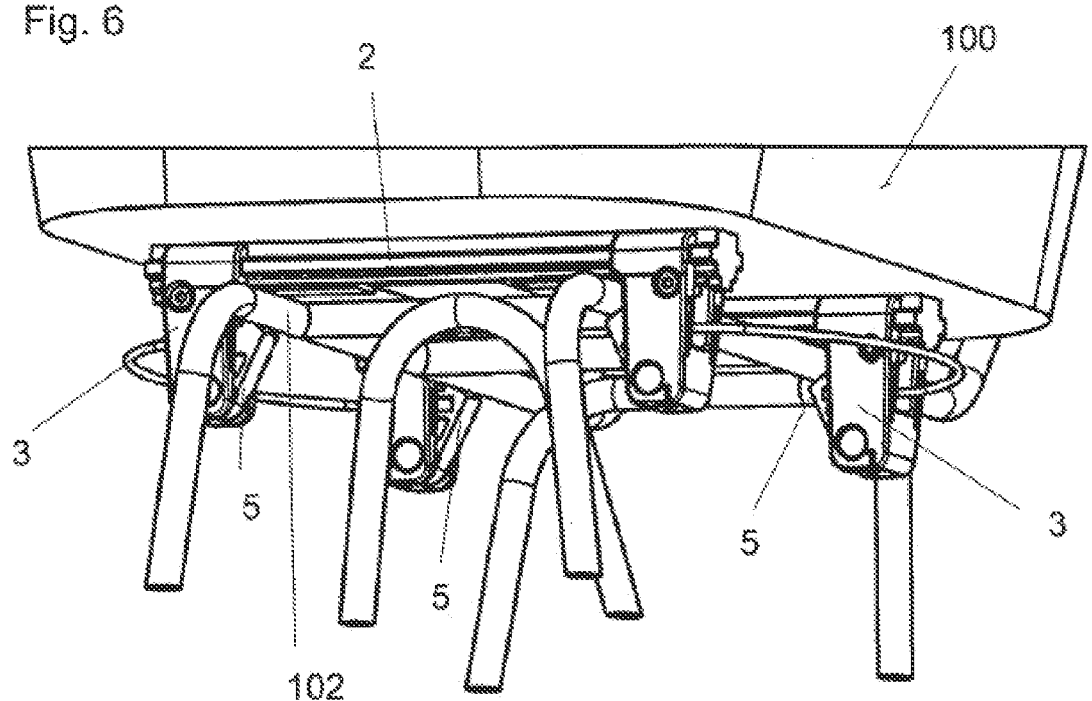

2010/0108729 A1    5/2010  Golub
2015/0344089 A1*  12/2015  Bopanna ............... H01F 7/0252
                                                                                                 224/430

FOREIGN PATENT DOCUMENTS

| | | | |
|---|---|---|---|
| DE | 102006055463 A1 | 5/2008 | |
| DE | 102007040557 A1 | 3/2009 | |
| DE | 102009030000 A1 | 12/2010 | |
| DE | 102015008780 A1 | 1/2017 | |
| DE | 102016010026 A1 | 2/2018 | |
| EP | 3281853 A1 | 2/2018 | |
| GB | 2421758 A * | 7/2006 | ............... B62J 7/08 |
| WO | WO-2022045880 A1 * | 3/2022 | |

* cited by examiner

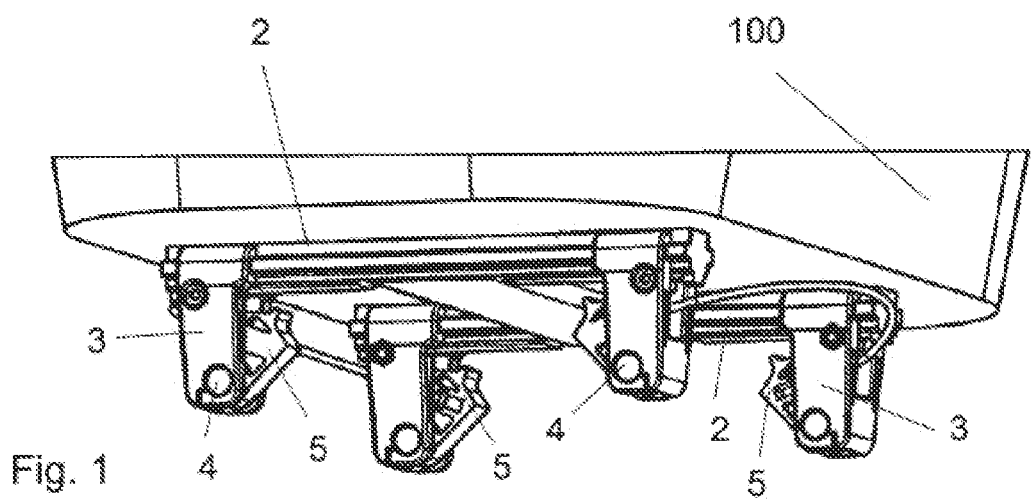
Fig. 1
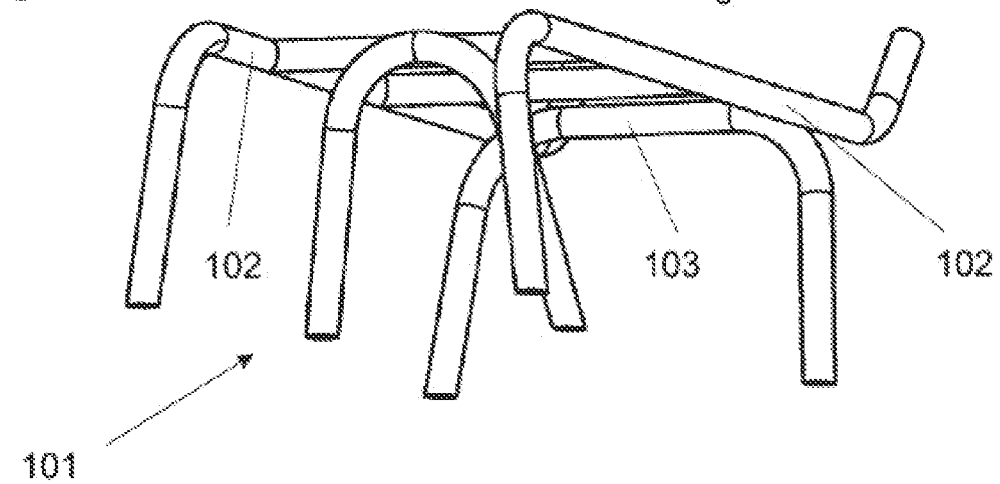
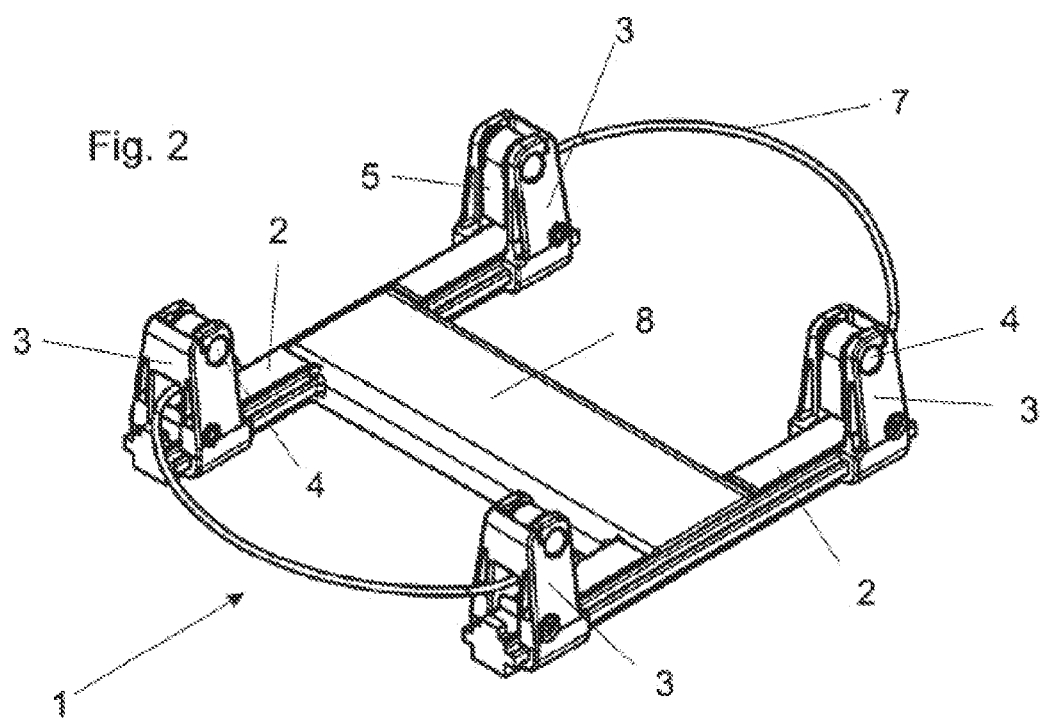
Fig. 2

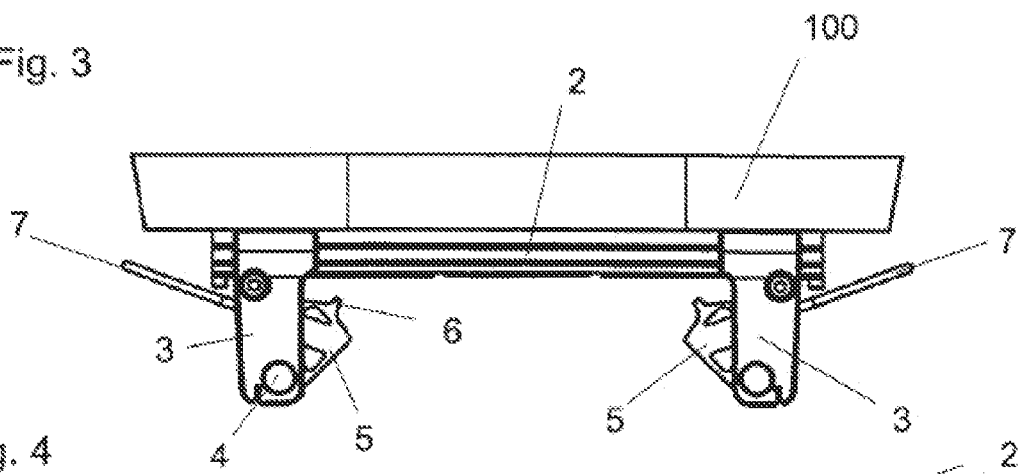
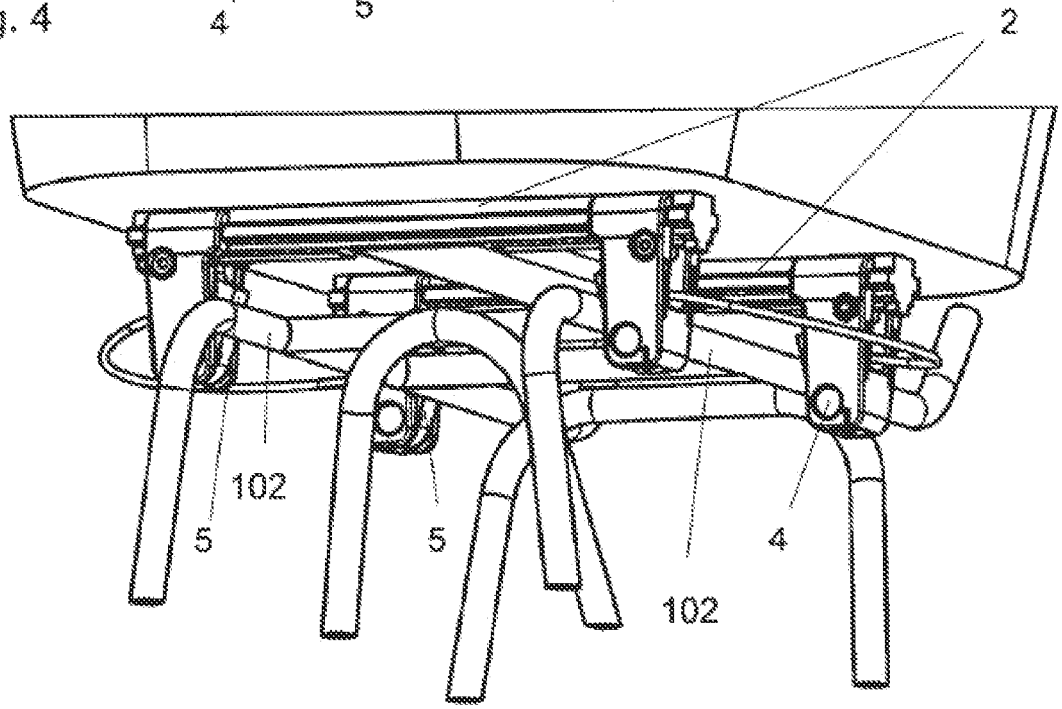
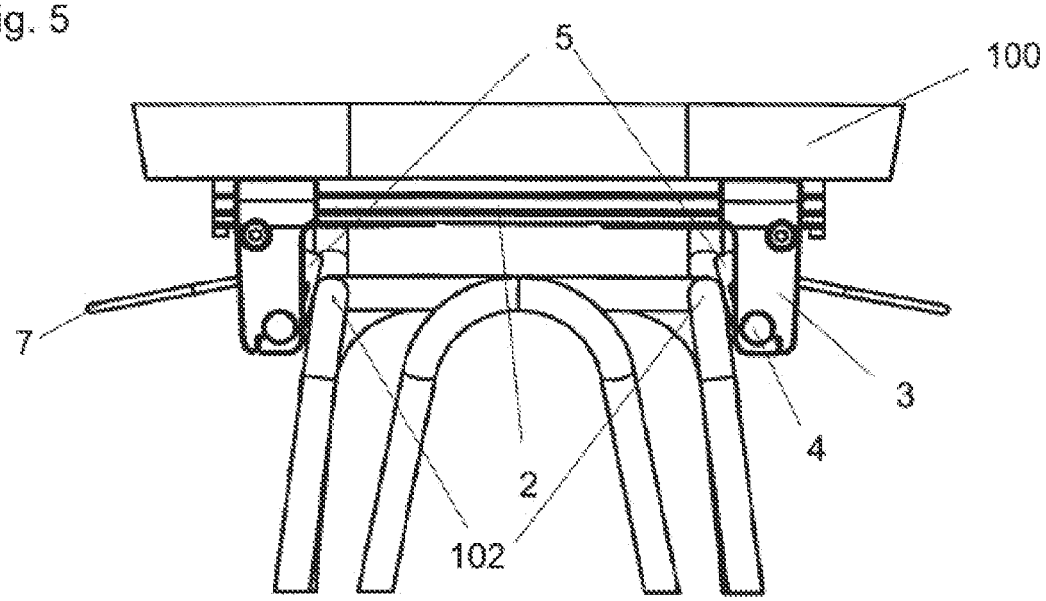

ADAPTER FOR ATTACHING BAGS OR CONTAINERS OF LUGGAGE CARRIERS

CROSS REFERENCE TO RELATED APPLICATIONS

This application relates to and claims priority as a § 371 national phase from PCT/DE2020/000221 filed Sep. 26, 2020 the entire contents of which are incorporated herein fully by reference, which in turn claims priority to German Ser. No.: DE 20 2019 004 035.5 filed Oct. 1, 2019 and from German Ser. No.: DE 2020 2019 004 429.9 filed Oct. 29, 2019.

Figure Selected for Publication

FIG. 1

The present invention relates to an adapter system for attaching bags or containers to luggage carriers, in particular for attaching bags or containers on the upper side of a luggage carrier such as a rear bicycle luggage carrier or a similar luggage carrier provided with struts.

Various variants of adapter systems or fastening devices for fastening bags to luggage carriers, in particular for fastening bags or containers to a bicycle luggage carrier, are known. Bags are very often attached to the side of a luggage carrier and are commonly referred to as panniers or panniers for bicycles. DE102006039465 shows an example of such a bag, which can be fastened to the side of a bicycle luggage carrier.

Various variants are also known for carrying bags and/or containers on the upper side of a luggage carrier, which should also meet different requirements.

DE102009030000A1 discloses an embodiment of a bag which has a hook element on one side on its underside, which engages around a longitudinal strut of the luggage carrier when the bag is pushed laterally onto the luggage carrier and thus guides the bag. On the opposite side of the bottom of the bag there is a Velcro strip, which can be guided around another strut and is thus intended to fix the bag.

DE1930993 discloses a bag which is equipped on its underside with a central tensioning element which is loaded with a spring and presses the two parts of the element laterally outwards. By inserting one side of the tensioning element around a strut on the upper side of a luggage carrier, a kind of hook engages around a strut of the luggage carrier and the opposite element of the tensioning element can be pushed back by pressing against the spring force so far that after relaxing it comes to rest behind another strut. This holds the bag between the two struts and fastens the bag to the upper side of the carrier.

DE 202004019891U1 shows a bag which is equipped on its underside with Velcro strips for fastening to struts of a luggage carrier and also has lateral snap fasteners which can engage around longitudinal struts of the luggage carrier positioned thereon at a distance of the bag width in order to fix the bag.

Also known are systems with a holding device to be mounted on the luggage carrier, to which in turn bags can then be fastened. The holding device and the bag have appropriate, corresponding coupling elements for this purpose. The holding device mounted on the luggage carrier is usually firmly connected to the luggage carrier and protrudes beyond the upper side of the luggage carrier.

However, this attachment to the upper side of the luggage carder is increasingly disruptive, since this means that the upper side of the luggage carrier can no longer be fully used when the bag is not attached and the holding device is disruptive.

Some of the other known bags and/or fastening solutions for bags and/or containers function satisfactorily in part on a defined luggage carrier, but have the disadvantage that they do not support attachment or fastening to another luggage carrier, or only do so to a limited extent.

In particular, the position of the struts of the luggage carrier, their distance from one another and/or the diameter of the struts play a decisive role. For example, without a precisely defined distance between the longitudinal struts, the variants with lateral snap hooks according to DE 202004019891 or the spring-loaded tensioning element according to DE1930993 cannot be used. This is bothersome when changing the bag from one bike to another and of course when replacing the bike with a new one, since the bag could certainly continue to be used but, due to the requirements mentioned, it can no longer be fastened to another luggage carrier.

A further disadvantage of known bags for attachment to the upper side of the luggage carrier has been found in that in particular the versions with one or more Velcro straps for fastening do not achieve sufficient stability and/or the straps considerably lose their holding power during use or due to aging.

The object of the present invention is therefore to create an adapter system for attaching bags or containers to luggage carriers, in particular for attaching bags or containers on the upper side of a luggage carrier, which reduces or avoids the disadvantages mentioned. In particular, the object of the invention is to be able to leave the upper side of the luggage carrier flat if the bag is not carried along and to enable sufficiently high stability of the fastening when the bag is attached.

This object is achieved with the features of the characterizing part of claim 1. Further developments and advantageous embodiments of the invention are included in the further claims.

According to the invention, an adapter system for mounting or fastening to bags or containers with fixing elements for engaging around and/or acting and/or engaging on or between struts of a luggage carrier, and with which the hag or the container can reversibly attached with the adapter system to luggage carriers, in particular can be attached on the upper side of a luggage carrier, wherein the adapter system has at least two holding elements which act or engage on opposite struts of the adapter and are equipped with a spring-loaded and rotatably mounted lever, wherein the rotatably mounted lever has a geometry by means of which, in the position of the bag placed with the adapter system on the luggage carrier, a surface, a protrusion or an angular element or a shell element at that end of the lever which faces away from the pivot point pivots in from below in a manner gripping over or onto the luggage carrier strut and securely clamps or jams the adapter system on the luggage carrier struts in a self-locking manner and prevents a movement of the bag or the container with the adapter system upwards, wherein the lever has a handle by means of which the clamping position can be released.

In a simpler variant, only one of the holding elements described is equipped with a spring-loaded and rotatably mounted lever, the rotatably mounted lever having a geometry by means of which a surface, a protrusion or an angular element or a shell element at the end facing away from the pivot point of the lever, in the position of the bag placed with the adapter system on the luggage carrier, pivots in from below in a manner gripping over or onto the luggage carrier strut. In this simpler design, the remaining holding elements are designed as angles which only bear against the struts of the luggage carrier. For this purpose, the contact points between the angle or alternatively arc elements are preferably designed to increase friction or are equipped with a friction-increasing coating.

The holding elements are preferably adjustable along the struts of the adapter system and can be fixed in this adjusted position. In this way, an optimal adaptation of the adapter system to different luggage carriers and in particular luggage carrier geometries can be achieved. The size of the holding elements or just the support areas can also be designed to be variable or interchangeable, according to different luggage carrier situations, such as different diameters of the luggage carrier struts.

The two struts of the adapter system on which the holding elements are arranged are preferably connected to a cross strut, the length of which can preferably be adjusted and fixed. Thus, the adapter system can be used as a unit, which can be individually adapted to a luggage carrier. According to a particularly preferred embodiment, the adapter system is equipped on each of the two opposing struts with two holding elements each, each with a spring-loaded, essentially wedge-shaped lever arranged rotatably in a pivot point. This spring-loaded lever in each of the holding elements pivots due to the spring force out of the actual housing of the holding element and is initially pushed back by the acting luggage carrier strut when placing the bag with the adapter system on a luggage carrier. Due to the wedge-shaped lever, which is preferably designed with a surface, a protrusion or an angled shoulder on its side facing the luggage carrier strut, said lever pivots completely and self-lockingly between the pivot point in the holding element and the underside of the luggage carrier strut, in the completely attached position of the bag with the attached adapter system. As a result, the bag with the adapter system fixedly mounted on the underside of the bag is held securely and reliably, in a self-locking manner, on the luggage carrier struts. In a further preferred embodiment, the lever is made of a friction-increasing material, or at least the surface of the lever that comes into contact with the luggage carrier strut is designed with a friction-increasing coating and/or insert.

The respective lever elements can be pivoted back manually by means of a handle to release the adapter system from the luggage carrier strut, whereby the lever is pivoted away from the underside of the luggage carrier strut and the bag with the adapter system can be removed upwards. A handle, such as a strap, a rope or the like, is preferably connected to two lever elements which are arranged on a common strut of the adapter system, and two levers can thus be operated on the right and/or left side of the bag, for example in the direction of travel. In a further embodiment, the handles and/or the levers in the holding elements are designed to be lockable.

The support structure of the adapter system comprising both struts with the cross strut, which is interposed between the two, is preferably fixedly connected to a bag, basket or other container, such as by bolting or is also positively connected to the bag, such as by welding or gluing, for example.

Figure 7:
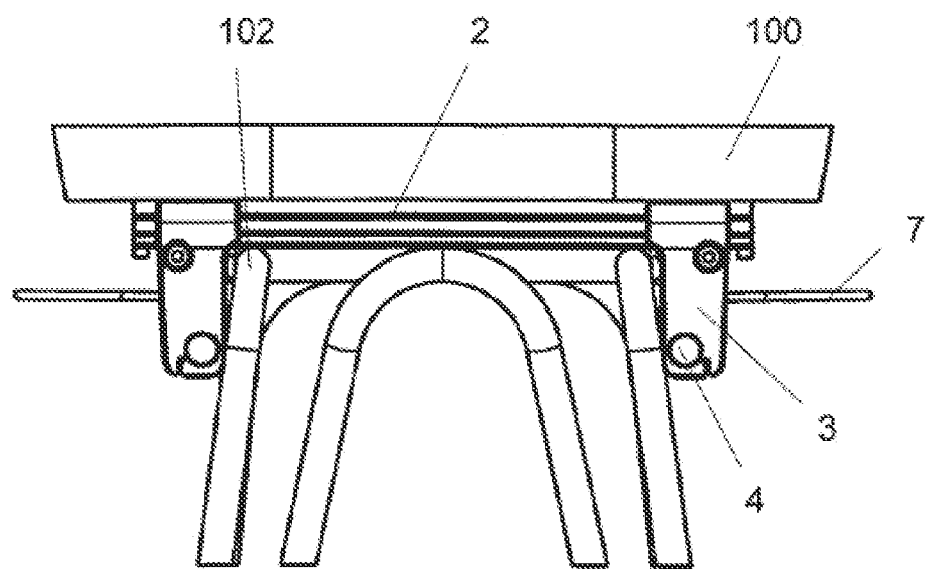
Figure 8:
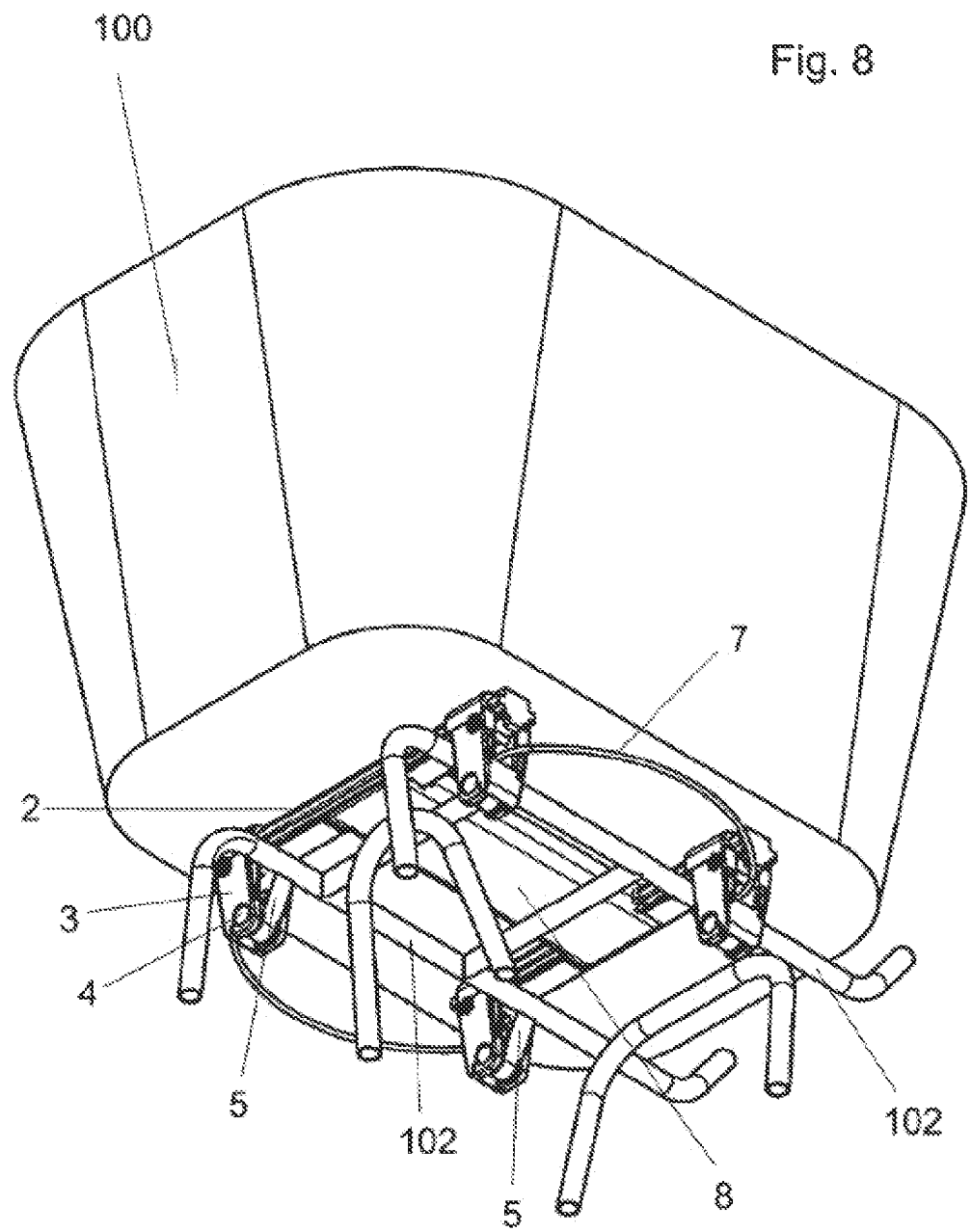

In the following, the invention is described in more detail by way of example with reference to drawings, in which:

FIG. 1 shows a bag with an adapter system over a luggage carrier before its placement, FIG. 2 shows a perspective view of an adapter system for placing and clamping on a luggage carrier, FIG. 3 shows a view of an adapter system on a bag or a basket, FIG. 4 shows a perspective view of an adapter system on a basket shortly before the placement end position on a luggage carrier, FIG. 5 shows a perspective view of an adapter system on a basket shortly before the placement end position on a luggage carrier, FIG. 6 shows a perspective view of an adapter system on a basket shortly before the placement end position on a luggage carrier, FIG. 7 shows a perspective view of an adapter system on a basket shortly before the placement end position on a luggage carrier, FIG. 8 shows a perspective view of an adapter system on a basket shortly before the placement end position on a luggage carrier, An adapter 1 according to the invention or an adapter system is shown in FIG. 1 on top of a luggage carrier 101 and in FIG. 2 in an individual perspective view. Before use, the adapter is or has to be permanently mounted on a bag, a basket 100 or another container and adjusted to the corresponding luggage carrier 101 for the first use. The holding elements 3 are designed to be displaceable on the struts 2 of the adapter 1 running parallel to the longitudinal struts 102 of the luggage carrier 101 and to be fixed in the required position, which is preferably done by clamping screws. As a result, the adapter system can be optimally adapted to the distance between the longitudinal struts of an individual luggage carrier. The distance between the two struts 2 of the adapter running parallel to the longitudinal struts 102 of a luggage carrier is defined by means of a cross strut 8 of the adapter, which is preferably adjustable in length. The side or surface of the struts 2 facing away from the bag or the container, which is placed on the struts of the luggage carrier, is preferably made, equipped or coated with a rubber material or another material that increases the friction. As a result, the adapter can also be adapted in a non-slip manner to existing cross struts 103 of a luggage carrier 101 without colliding with them. In the preferred embodiment, the adapter forms a complete component 1 which is connected to a bag, basket or other container by screwing, riveting, welding or similar suitable methods. In a further variant, the adapter can also be formed as an integral part of the bag and formed directly on the bottom of the bag or the container or sewn to the bag. The adapter connected to the bag, the basket or a container, as shown in FIG. 3, can be further adapted to the most varied designs of luggage carriers.

The holding elements 3 shown here are each formed with an essentially wedge-shaped, spring-loaded lever 5 which is rotatably mounted at a pivot point 4 and which moves out of the holding element against the strut of the luggage carrier before being placed on the luggage carrier, as can be seen in FIGS. 1, 3 and 4. When the bag with the permanently mounted adapter is put in place, the levers are first pivoted back by the luggage carrier struts 102 and only pivot fully outwards when the adapter is completely placed on the luggage carrier, as can be seen in the perspective view of FIG. 6 and the front view of FIG. 7, whereby a surface 6 or bulge or ridge grips or engages the underside of the carrier strut and provides self-locking for the fixation of the adapter to the carrier struts. The lever is preferably designed with a central elevation 6 or half-shell on the support surface, which prevents the lever from pivoting further out beyond the underside of the luggage carrier side and no longer acting on it. A self-locking, secure connection is achieved with this fastening, which is obtained by simply placing the bag with the adapter system mounted on the bag. A lifting of the bag is effectively prevented by the self-locking adapter. The bag, the basket or another container equipped with the adapter system can also be removed very conveniently by means of a handle for each of the holding elements on one side of the bag. Here, by pulling on the handle 7, the levers 5 are pivoted back from the underside of the luggage carrier strut 102 into the holding element and the adapter system can be lifted off the luggage carrier at an angle upwards on this side.

Having described preferred embodiments of the invention with reference to the accompanying drawings, it is to be noted that the invention is not limited to the precise embodiments thereof and various changes and modifications can be made therein by one skilled in the art without departing from the scope of the invention as defined in the appended claims.

The invention claimed is:

1. An adaptor system, for releasably mounting a container to a luggage carrier, comprising:
    a container having on a bottom surface thereof at least one releasable fixing element system adapted for releasable engagement with an upper side of said luggage carrier;
    said luggage carrier includes at least two opposing elongated struts positioned in a parallel alignment with each other;
    at least one cross strut spacing said respective opposing struts;
    said cross strut having an adjustable length;
    said at least one releasable fixing element system, further comprising:
        at least one pair of opposed holding elements adapted to engage respective ones of said two opposing struts;
        each said holding element having at least one spring-loaded and rotatably mounted lever having a wedge shape with point end pivoting on a pivot point and a wedge end facing away from said pivot point;
        each said spring-loaded and rotatably mounted lever adapted to urge inwardly toward each respective said opposing strut during engagement;
        each wedge end further including a protrusion shaped to project below said upper side of said luggage carrier and engage a bottom surface of each respective said strut in a spring-loaded self-locking jam-fit manner preventing unintended separation between said releasable fixing element and said luggage carrier on engagement;
        each said protrusion having a profile shaped to match a surface profile shape of each respective said strut and enable said jam-fit manner;
    a common handle having opposed ends spacing a gripping section therebetween; and
    said ends of said common handle joining opposed respective spring-loaded rotatably mounted levers and actuating said lever from an engaged position to a disengaged position allowing ready separation between said container and said luggage carrier.

2. The adaptor system, according to claim 1, further comprising:
    a support structure for said adaptor system formed as a frame-shaped structure connected to said bottom surface of said container; and
    an adjusting means in said support structure to adjust the distances between said pairs of opposed holding elements to adapt to said adjustable length of said cross strut.

3. The adaptor system, according to claim 2, further comprising:
    a friction-increasing coating on each respective said opposing elongated strut.

4. The adaptor system, according to claim 3, wherein:
    said spring-loaded and rotatably mounted lever is made of a friction-increasing material.

5. The adaptor system, according to claim 4, further comprising:
    at least a second pair of said opposed holding elements adapted to engage respective ones of said two opposing struts;
    a second common handle having opposed ends spacing a gripping section therebetween; and
    said ends of said second common handle joining opposed respective second spring-loaded rotatably mounted levers and actuating a second lever from said engaged position to said disengaged position allowing ready said separation between said container and said luggage carrier.

6. The adaptor system, according to claim 3, wherein:
    said common handle is lockable for releasing a locking of said spring-loaded and rotatably mounted lever.

7. The adaptor system, according to claim 3, wherein:
    said releasable fixing element system is fixably secured on said bottom surface of said container preventing unintended separation.

* * * * *